(12) United States Patent
Chen et al.

(10) Patent No.: US 11,279,431 B2
(45) Date of Patent: Mar. 22, 2022

(54) COMPACT AUTO-BALANCING TRANSPORTATION DEVICE

(71) Applicants: Shane Chen, Camas, WA (US); Ywanne Chen, Camas, WA (US)

(72) Inventors: Shane Chen, Camas, WA (US); Ywanne Chen, Camas, WA (US)

( * ) Notice: Subject to any disclaimer, the term of this patent is extended or adjusted under 35 U.S.C. 154(b) by 206 days.

(21) Appl. No.: 16/739,091

(22) Filed: Jan. 9, 2020

(65) Prior Publication Data

US 2020/0262504 A1 Aug. 20, 2020

Related U.S. Application Data

(60) Provisional application No. 62/790,301, filed on Jan. 9, 2019.

(51) Int. Cl.
| | |
|---|---|
| *B62K 11/00* | (2006.01) |
| *B62J 43/20* | (2020.01) |
| *B62J 43/16* | (2020.01) |
| *B62J 45/415* | (2020.01) |
| *B62J 43/28* | (2020.01) |
| *B62M 7/12* | (2006.01) |
| *A63C 17/01* | (2006.01) |
| *A63C 17/12* | (2006.01) |

(52) U.S. Cl.
CPC .......... *B62K 11/007* (2016.11); *A63C 17/014* (2013.01); *A63C 17/12* (2013.01); *B62J 43/16* (2020.02); *B62J 43/20* (2020.02); *B62J 43/28* (2020.02); *B62J 45/4151* (2020.02); *B62M 7/12* (2013.01); *A63C 2203/12* (2013.01); *A63C 2203/18* (2013.01); *B60L 2200/16* (2013.01); *B60L 2240/22* (2013.01); *B60L 2260/34* (2013.01)

(58) Field of Classification Search
CPC ....... B62J 43/16; B62J 43/28; B60L 2200/16; B60L 2200/24; B60L 2240/32
USPC .................................. 180/7.1, 21, 87.1, 218
See application file for complete search history.

(56) References Cited

U.S. PATENT DOCUMENTS

| 8,738,278 B2 * | 5/2014 | Chen ..................... B62K 11/007 701/124 |
| 2018/0170291 A1 * | 6/2018 | Gorji ....................... B60L 1/006 |
| 2019/0337585 A1 * | 11/2019 | Ying ....................... B62K 3/00 |

* cited by examiner

*Primary Examiner* — Kevin Hurley
*Assistant Examiner* — Hosam Shabara

(57) ABSTRACT

An auto-balancing transportation device having a compact form. Left and right foot platform sections are coupled for fore-aft tilt angle movement relative to one another. Left and right wheels are provided under the respective foot platforms. With a rider's weight directed primarily downward onto the wheels and not onto the coupling structure, the coupling structure may have sufficient space to house the battery. In addition, more efficient and lighter weight supports and bearing arrangements may be used in the coupling structure. Various embodiments are disclosed.

19 Claims, 4 Drawing Sheets

COMPACT AUTO-BALANCING TRANSPORTATION DEVICE

CROSS REFERENCE TO RELATED APPLICATIONS

This application claims the benefit of U.S. Provisional Application No. 62/790,301, filed Jan. 9, 2019, entitled Self-Balancing Personal Vehicles, and having Ywanne Ying Chen as inventor.

FIELD OF THE INVENTION

The present invention relates to auto-balancing transportation devices and, more specifically, to compact form and reduced cost manufacture in hover board type auto-balancing devices.

BACKGROUND OF THE INVENTION

The prior art includes several auto-balancing transport devices. These include the Segway, developed by Kamen et al and disclosed in U.S. Pat. No. 6,302,230 (among others), the Solowheel, by Chen (U.S. Pat. No. 8,807,250) and Hovertrak, also by Chen (U.S. Pat. No. 8,738,278). These three patents are hereby incorporated by reference as though disclosed in their entirety herein.

With respect to the Hovertrak of the '278 patent, this device has become popular. A need exists, however, for a device like that of the '278 patent, yet that is more compact and in which the components are more strategically arranged, particularly the battery, wheels and support structure. A need also exists to reduce the cost of manufacturing compared to prior art devices and fabrication techniques.

SUMMARY OF THE INVENTION

Accordingly, it is an object of the present invention to overcome shortcomings of the prior art.

It is another object of the present invention to provide an auto-balancing transportation device with more compact form.

It is also an object of the present invention to provide a hover board type device with the battery located between the foot platforms and the wheels under the foot platforms.

These and related objects of the present invention are achieved by use of a compact form auto-balancing device as described herein.

The attainment of the foregoing and related advantages and features of the invention should be more readily apparent to those skilled in the art, after review of the following more detailed description of the invention taken together with the drawings.

DETAILED DESCRIPTION

Figure 1:
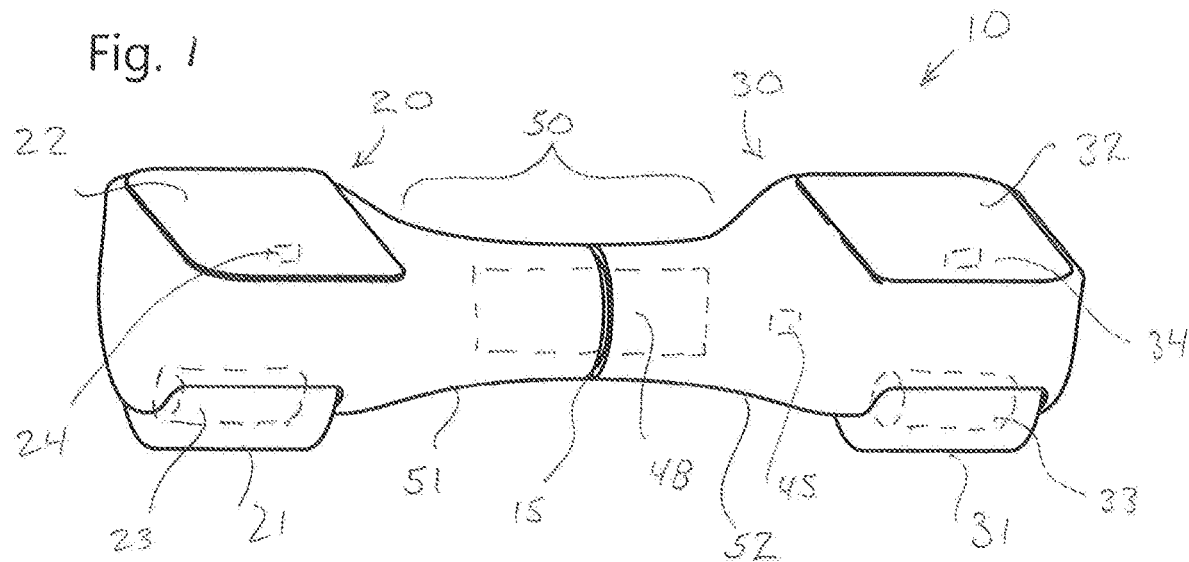
FIG. 1 is a perspective view of an auto-balancing device 10 in accordance with the present invention.

Referring to FIG. 1, a perspective view of an auto-balancing device 10 in accordance with the present invention is shown. Device 10 is similar to the auto-balancing device of the '287 patent, for example, they are both auto-balancing devices in which a rider stands facing forward.

Device 10 may include two wheels 21,31, foot platforms 22,32, two motors 23,33, two fore-aft tilt angle position sensors 24,34, such as a gyroscopic sensor, control circuit 45 and battery 48. The left and right portions 20,30 of device 10 are housed in housing sections 51,52, respectively, and preferably coupled to one another through a coupling structure or "bridge" 50. This structure provides adequate platforms spacing for a desired riding position, maintains the wheels in a parallel relationship, provides adequate structural support, and affords fore-aft tilt angle movement of the two platform sections 20,30. Seam or gap 15 is visible where the two housing sections 51,52 meet externally.

Figure 2:
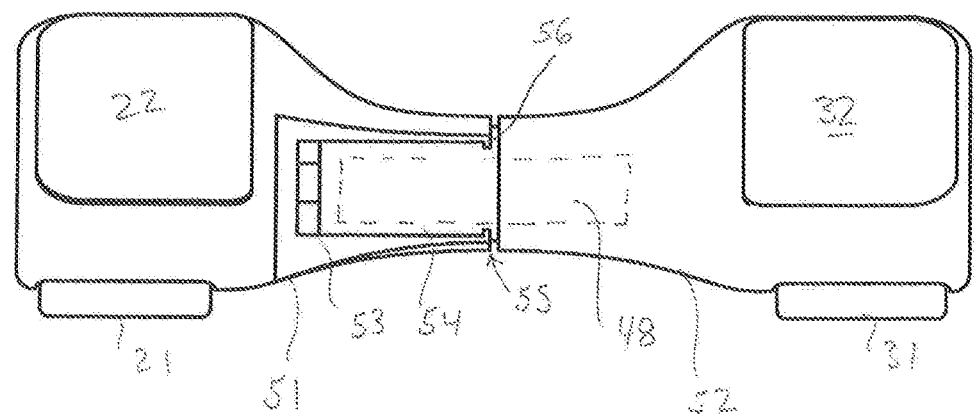
FIG. 2 is a cut-away view that shows the inter-coupling of the left side housing with the right side housing.

FIG. 2 is a partial cut-away view that shows the inter-coupling of the left side housing 51 with the right side housing 52. Housing 52 has a sheath 54 that extends into a sheath recess 53 in housing 51. The sheath is secured to housing 51 via an annular protrusion 55 that fits into a complementary recess 56. Battery 48 is preferably provided within the volume (or cavity 49) within sheath 54.

In conventional hover board embodiments, such as that of the '278 patent, the wheels are outside of the foot platforms. This causes the weight of a rider to exert a considerable force on the coupling structure. The present invention recognizes that by placing the wheels under the platforms, the weight of the rider is no longer exerted on the coupling structure (it is exerted directly downward onto the wheel), eliminating the need for larger bearings and support structures in the bridge. The elimination of these components yields sufficient space in coupling structure 50 to house battery 49, which then frees up space under the platforms (where the battery is located conventionally) for the wheels. This achieves the desired more compact form.

Furthermore, reducing bearing size and structural support also reduces manufacturing costs, overall device weight, and shipping costs, etc.

Housing recess 53, sheath 54, protrusions 55 and complementary recess 56 may be made of or coated with a low-friction high-wear nylon or similar substance for long duration, low friction movement of the left and right foot platforms (and housing sections 51,52) relative to one another.

Figure 3:
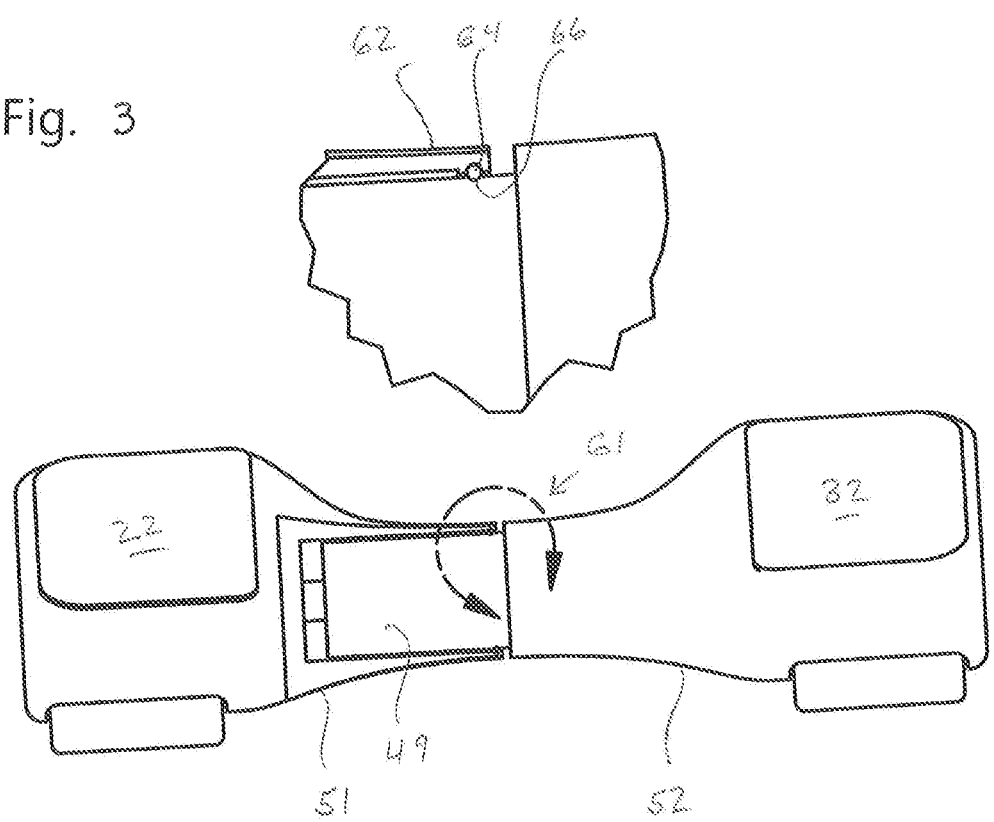
FIG. 3 illustrates, in partial cross-section, the device of FIGS. 1-2 yet with an alternative bearing arrangement.

FIG. 3 illustrates, in partial cross-section, device 10 of FIGS. 1-2 yet with an alternative bearing arrangement 61. Bearing arrangement 61 includes an extension 62 from housing section 51 that fits around sheath 54 and couples via ball bearings 64 in recess 66. The extension, ball bearings and recess are provided annularly around sheath 54. The design of device 10 allows use of a lighter weight ball bearing arrangement than in prior art devices.

Figure 4:
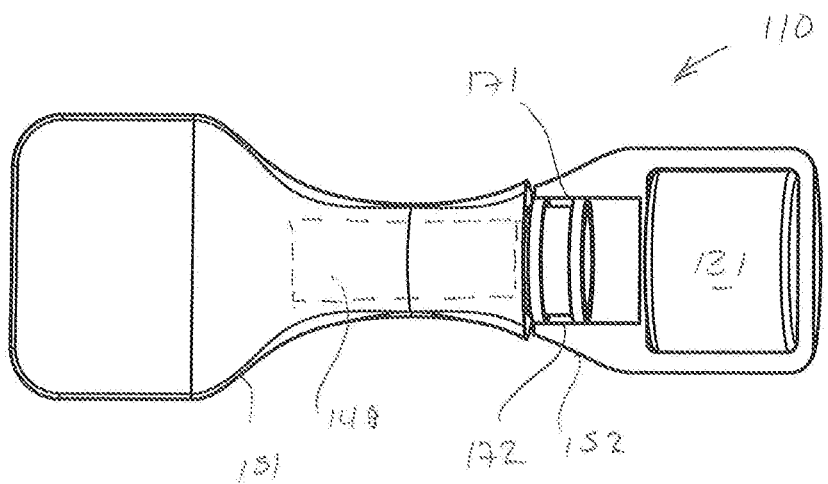
FIGS. 4-5 show an alternative embodiment for coupling the two platform sections.
Figure 5:
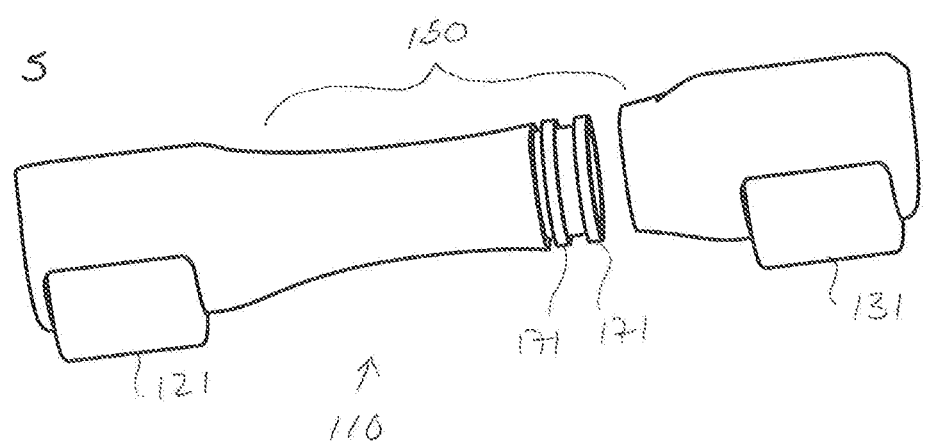

FIGS. 4 and 5 show an alternative embodiment for coupling the two platform sections. In device 110, housing section 151 is longer than housing section 152 and terminates with a couple of bearing rings 171. These rings fit within a complementary structure 172 within housing section 152 (shown in cut-away) to securely yet rotatably couple the two housing sections together. There is sufficient space within coupling structure 150 to house battery 148, yet the coupling structure or bridge (in this or other embodiments) it is still sized for ready carrying by hand.

Figure 6:
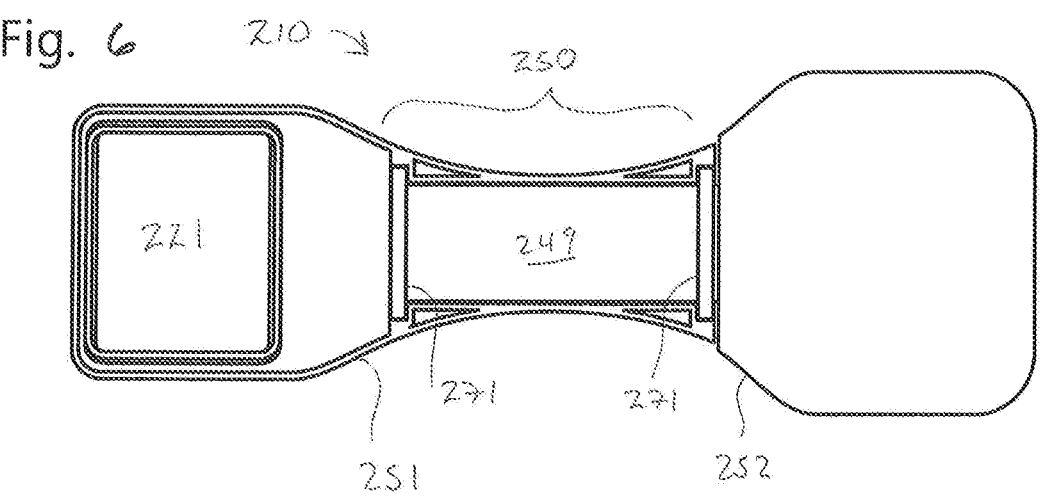
FIGS. 6-7 show yet another embodiment for coupling the two platform sections.
Figure 7:
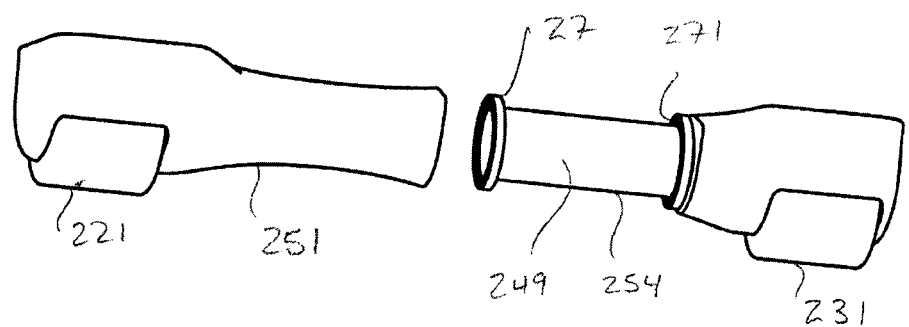

FIGS. 6 and 7 show another embodiment for coupling the two platform sections. The embodiment of FIGS. 6-7 is similar to that for FIGS. 4-5, yet the two bearing rings 271 are provided on opposite sides of the cavity 249 rather than adjacent one another on one side. It should also be recognized that the battery (and cavity) may be within a bearing, i.e., a bearing encircling the battery, for example, located laterally inside of the positions shown in FIGS. 6-7.

Figure 8:
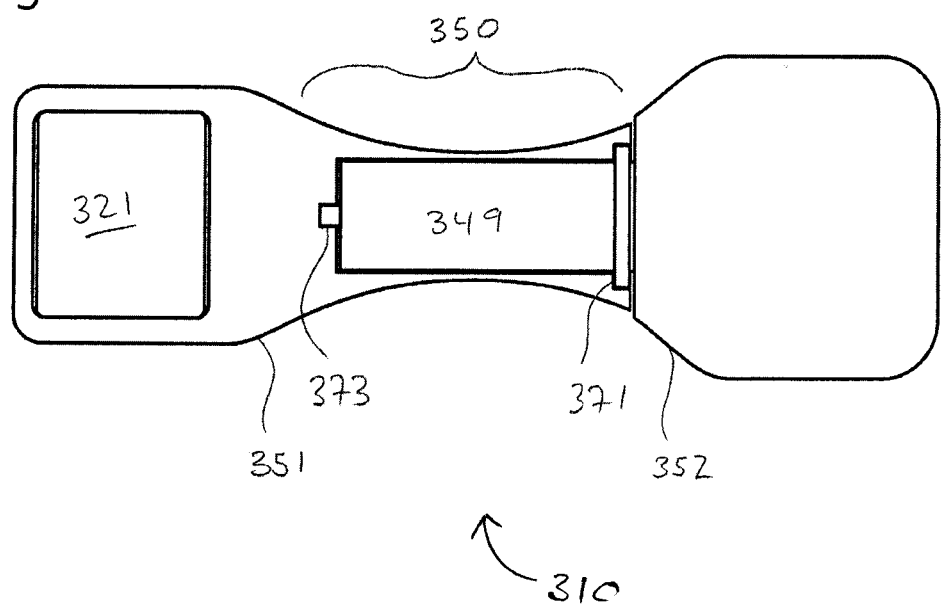
FIG. 8 shows an embodiment similar to that of FIGS. 6-7 yet with two different sized bearings.

FIG. 8 shows yet another embodiment of an auto-balancing device 310 in accordance with the present invention. Device 310 is similar to that of device 210 of FIGS. 6-7, yet one bearing ring 373 is smaller than the other 371.

It can be seen in FIG. 6 that bearing 271 has a greater cross-sectional dimension than cavity 249, and in FIG. 8 that bearing 371 has a greater cross-sectional dimension than cavity 349.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. An auto-balancing transportation device, comprising:
a first foot platform section having a first foot platform, a first wheel, a first drive motor and a first sensor;
a second foot platform section having a second foot platform, a second wheel, a second drive motor and a second sensor;
a control circuit that drives the first wheel towards auto-balancing the first foot platform section based on data from the first sensor and that drives the second wheel towards auto-balancing the second platform section based on data from the second sensor; and
a coupling structure that couples the first foot platform section and the second foot platform section to one another such that the first and second platform sections are movable in fore-aft tilt relative to one another; and
a battery;
wherein the coupling structure is configured to define a cavity that holds the battery.

2. The device of claim 1, wherein the first wheel is located vertically under the first foot platform and the second wheel is located vertically under the second foot platform.

3. The device of claim 1, wherein the coupling structure includes first and second housing sections, and wherein the first housing section extends more than half of the distance between the first and second platform sections, and fits within a complementary recess defined by the second housing section.

4. The device of claim 1, wherein the coupling structure includes a first section extending from the first foot platform and a second section extending from the second foot platform, and the first and second sections are coupled through a bearing arrangement.

5. The device of claim 4, wherein the bearing arrangement includes a first bearing and a second bearing that are spaced from one another and arranged in parallel.

6. The device of claim 5, wherein the battery is located between the first and second bearings.

7. The device of claim 4, wherein the battery is located, at least in part, within the bearing arrangement.

8. The device of claim 1, wherein the coupling structure includes a first section extending from the first foot platform and a second section extending from the second foot platform, and the first and second sections are coupled through a non-ball-bearing bearing arrangement.

9. The device of claim 1, wherein the coupling structure includes a first bearing of a given annular size and a second bearing of a different annular size than the first bearing.

10. The device of claim 1, wherein the cross-sectional dimension of the cavity in the line of travel of the device is less than the cross-sectional dimension of a bearing in the line of travel of the device.

11. An auto-balancing transportation device, comprising:
a first foot platform section having a first foot platform, a first wheel, a first drive motor, and a first sensor;
a second foot platform section having a second foot platform, a second wheel, a second drive motor, and a second sensor;
a control circuit that drives the first wheel towards auto-balancing the first foot platform based on data from the first sensor and that drives the second wheel towards auto-balancing the second foot platform based on data from the second sensor; and
a coupling structure that couples the first foot platform section and the second foot platform section to one another such that the first and second foot platforms are movable in fore-aft tilt relative to one another;
a battery located at least in part within the coupling structure;
wherein the first wheel is located vertically under the first foot platform and the second wheel is located vertically under the second foot platform.

12. The device of claim 11, wherein the coupling structure includes first and second housing sections, and wherein the first housing section extends more than half of the distance between the first and second platform sections, and fits within a complementary recess defined by the second housing section in such a manner that the first and second housing sections rotate in fore-aft relative to one another.

13. The device of claim 11, wherein the coupling structure includes a first section extending from the first foot platform and a second section extending from the second foot platform, and the first and second sections are coupled through a bearing arrangement.

14. The device of claim 13, wherein the bearing arrangement includes a first bearing and a second bearing that are spaced from one another and arranged in parallel.

15. The device of claim 14, wherein the battery is located between the first and second bearings.

16. The device of claim 13, wherein the battery is located, at least in part, within the bearing arrangement.

17. The device of claim 11, wherein the coupling structure includes a first section extending from the first foot platform and a second section extending from the second foot platform, and the first and second sections are coupled through a non-ball-bearing bearing arrangement.

18. The device of claim 11, wherein the coupling structure includes a first bearing of a given annular size and a second bearing of a different annular size than the first bearing.

19. The device of claim 11, wherein coupling structure defines a cavity to hold the battery, and the cross-sectional dimension of the cavity in the line of direction of travel is less than the cross-sectional dimension of a bearing in the line of direction of travel.

\* \* \* \* \*